(No Model.) 2 Sheets—Sheet 1.

A. F. BERNARD.
WHEELED SCRAPER.

No. 526,676. Patented Oct. 2, 1894.

Witnesses.
J. Monteverde
W. H. Cobb

Inventor.
Alfred F. Bernard
by N. A. Acker
atty (No Model.) 2 Sheets—Sheet 2.
A. F. BERNARD.
WHEELED SCRAPER.
No. 526,676. Patented Oct. 2, 1894.
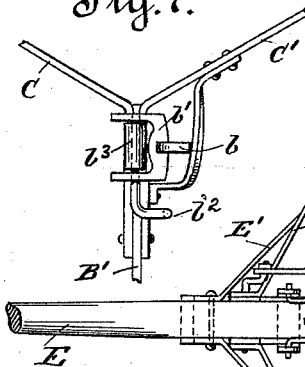
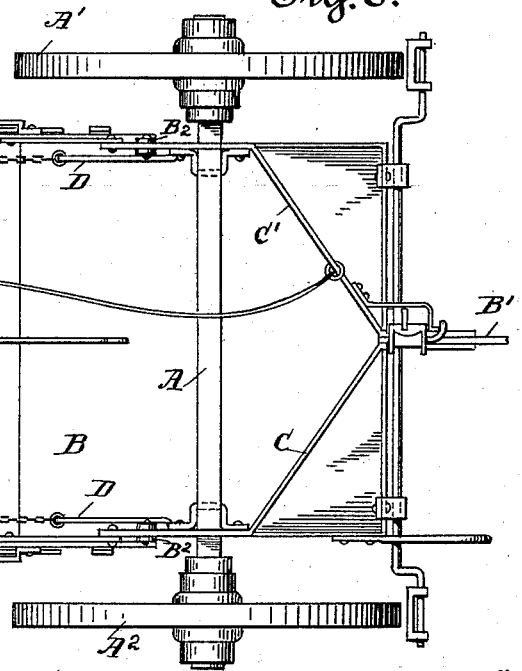
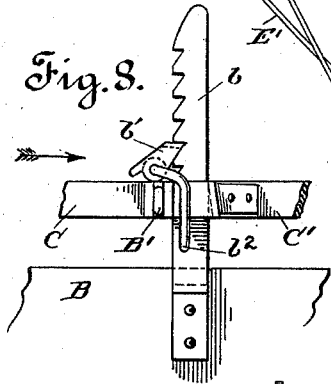
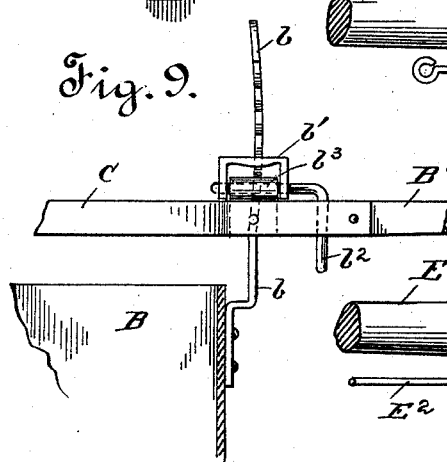
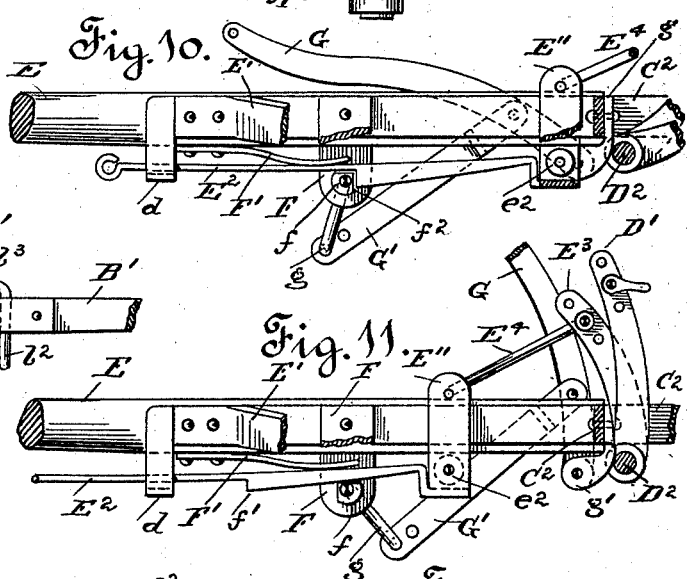
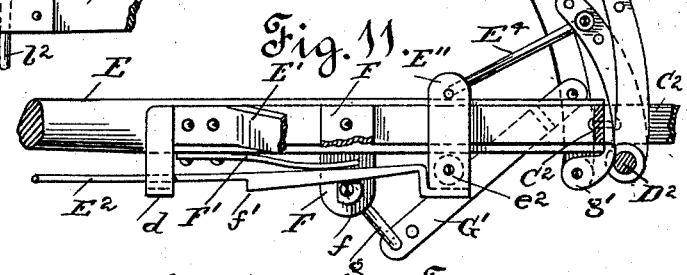
Witnesses.
Inventor.
Alfred F. Bernard
by N. A. Acker
atty

UNITED STATES PATENT OFFICE.

ALFRED F. BERNARD, OF SAN LUIS OBISPO, CALIFORNIA.

WHEELED SCRAPER.

SPECIFICATION forming part of Letters Patent No. 526,676, dated October 2, 1894.

Application filed February 16, 1894. Serial No. 500,414. (No model.)

*To all whom it may concern:*

Be it known that I, ALFRED F. BERNARD, a citizen of the United States, residing at San Luis Obispo, in the county of San Luis Obispo and State of California, have invented certain new and useful Improvements in Wheeled Scrapers; and I do hereby declare the following to be a full, clear, and exact description of said invention, such as will enable others skilled in the art to which it most nearly appertains to make, use, and practice the same.

This invention relates to certain new and useful improvements upon that class of wheeled scrapers, fully set forth in the application filed by me in the United States Patent Office on the 29th day of May, 1893, which application bears Serial No. 475,853.

My invention consists of mechanism for automatically transmitting the power of the lead or snatch team so as to operate the body raising handle or lever in order that the same may engage with the scraper body and raise the same clear of the ground after the body has been filled with dirt; and of a device for automatically releasing the strain or power transmitted to the operating mechanism after the body has been raised clear of the ground, all as hereinafter described and claimed.

In the ordinary wheeled scraper the body is constructed to hold about thirteen cubic feet of dirt, although a team is capable of hauling a much greater load. However, it is necessary that the body be constructed to receive only a small load for the reason that the body is swung clear of the ground by the operator of the machine who pulls downward upon the outer end of the body raising lever. By my device, that is operating the raising lever through the power transmitted from the snatch team, I am enabled to materially increase the size of the body, in fact to such a size as will hold about twenty-two or more cubic feet or nearly a cubic yard. This amount can easily be hauled by the team to the place of dump after the body has been raised.

Figure 1:
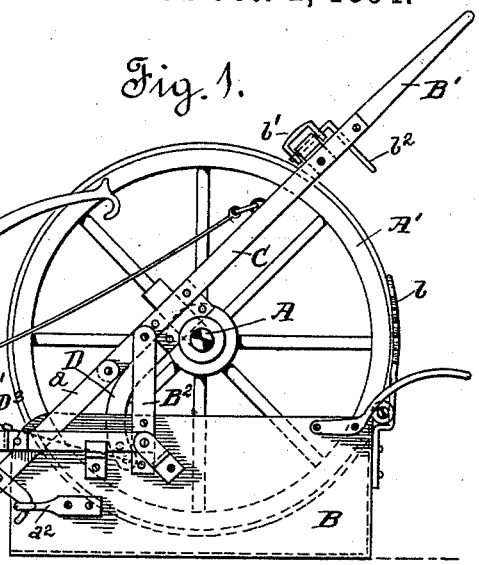
Figure 2:
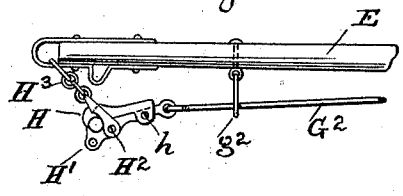
Figures 3, 4:
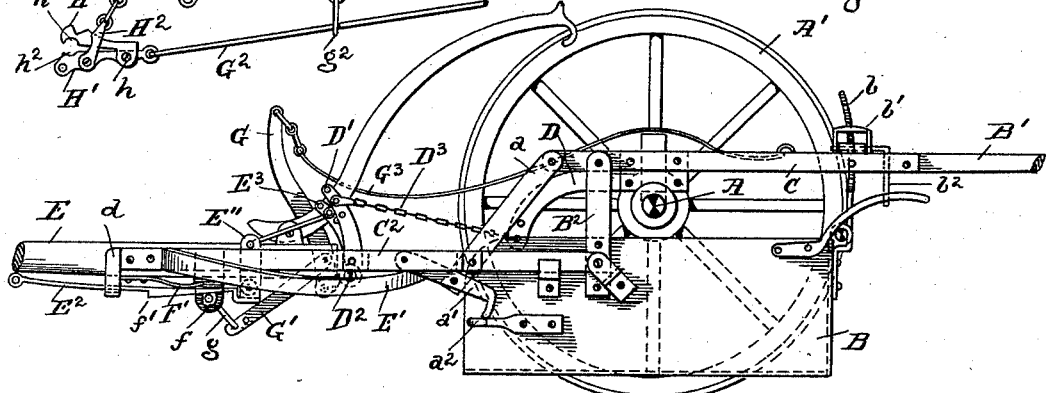
Figure 5:
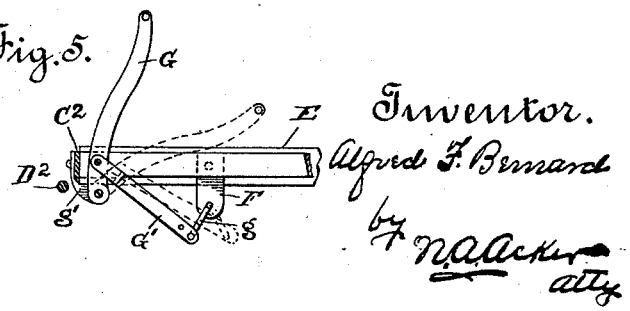

Referring to the drawings forming a part of this application, wherein similar letters of reference are used to denote corresponding parts throughout the entire specification and several views—Figure 1, is a side elevation showing the scraper body lowered and trigger mechanism and levers in position for throwing the body raising lever or handle; the end of tongue being broken away; Fig. 2, a detail of outer end of tongue, showing rod for operating the trigger mechanism and device for automatically releasing snatch team after lever has been lowered; Fig. 3, a similar view to Fig. 1, with body raised and position of trigger mechanism and levers after body raising lever or handle has been thrown; Fig. 4, a detail view showing end of tongue and device for releasing snatch team after body is raised; Fig. 5, a detail view of trigger operating lever; looking from opposite side of Fig. 3. Fig. 6, is a top plan of Fig. 3. Fig. 7, is a top plan of Fig. 8. Fig. 8, is a detail side elevation of the lock mechanism for the body raising lever. Fig. 9, is a front elevation of Fig. 8 viewed in direction of arrow. Fig. 10, is an enlarged detail of the trigger mechanism when in position illustrated by Fig. 1; Fig. 11, a similar view to Fig. 3, and Fig. 12, a detail of cam over which sliding trigger moves.

The axle of the scraper is indicated by the letter A, to the outer end of which the wheels $A'$, $A^2$, are secured. Below the axle I suspend the scraper body B, as shown in Figs. 1, 3 and 6. This axle is bolted or otherwise connected to forward portion of arms C, $C'$, which arms have the lever or handle $B'$, fastened between the outer ends thereof.

The axle A, is connected to the body B, by means of standards $B^2$, to which arms C, $C'$, of lever or handle $B'$, are movably secured. These arms I connect to frame $C^2$, which is fastened to the sides of the body and projected in front thereof by levers $a$, fastened to downwardly extending levers $a'$, movably secured to the frame $C^2$. The lower ends of levers $a'$, work within ears $a^2$, bolted to sides of the body. See Figs. 1 and 3.

As the handle or lever $B'$, is raised in order to lift the wheels and axle, the levers $a$, movably fastened to inner end of arms C, $C'$, of the handle, depress the movable levers $a'$, so as to cause ends thereof to bear against ears $a^2$, and hold body down while axle and wheels are raised clear of the ground. These ears and levers may be said to constitute the purchase for the body raising lever or handle $B'$. As the handle is lowered the body is raised in the usual manner.

To the back plate of the body is rigidly bolted the upwardly extending plate b, which forms a lock plate for the lever or handle B', when thrown into position to raise the body. One edge of this plate is serrated and the teeth formed thereby are engaged by the pawl $b'$, carried by the handle B'. This pawl is moved out of engagement with the serrated lock plate by means of the crank handle $b^2$. This handle is secured to the body raising handle B', by clip $b^3$.

To the axle A, I bolt the curved arms D, which extend forwardly beyond the ends of lever arms C, C', and are connected to upwardly bent portions or ends D', of oscillating rod $D^2$, (which rod is connected to frame $C^2$, by clips c, see Fig. 6) by chains $D^3$. When the lever or handle B', is raised the curved arms D, extend downwardly within the body of the scraper. By means of these arms the lever B', is lowered and the body raised clear of the ground as the oscillating rod is thrown forward through the medium of the connecting chains $D^3$, which are moved forward with the throw of said rod and carry the curved arms D, therewith.

To the frame $C^2$, I fasten the tongue E, which is supported by straps or brace bars E'. See Fig. 6. Upon the under face of the tongue E, works the slide or trigger plate $E^2$. The forward portion of this plate works through the guide strap d, which holds it in place, while the rear end is held in place by the bracket or strap E'', the upper ends of which strap or bracket I connect to the upwardly extending arms $E^3$, rigidly fastened to oscillating rod $D^2$, by means of links $E^4$. This bracket is fastened to rear end of slide or trigger plate. Consequently as the plate is carried forward the bracket moves therewith and serves to likewise throw the arms of the oscillating rod, the movement of which raises the curved arms D, and lowers the body raising handle or lever.

In order to obviate friction by the movement of the slide or trigger plate, I interpose between the bracket and under face of the tongue the friction roller $e^2$. See Figs. 10 and 11.

The slide or trigger plate passes through the guide F, which has the cam roller f, secured therein over which the plate moves. This plate is cut away at its forward portion, or reduced in thickness so as to provide a shoulder or catch $f'$. One face of the cam roll is flattened as shown at $f^2$, which flattened portion acts as a seat for the shouldered portion of the slide bar. Between the upper face of the slide or trigger plate and under face of the tongue I insert a flat spring F', which maintains a downward pressure upon the plate, and assures the plate moving into locked engagement with the cam roll when the slide plate has moved backward sufficiently far to cause the shouldered portion thereof to move off the cam roll. This cam roll is rotated with the outward movement of the slide or trigger plate by means of the lever G, which is connected to arm g, of the cam roll by link G'. The lever G, is movably secured to bracket $g'$, which projects from frame $C^2$.

From the forward end of the slide or trigger plate extends the rod $G^2$, which passes through the guide ring $g^2$. To this rod is attached the snatch block which consists of the jaws H, H', united together by pin h. The upper jaw is a movable one, while the lower one is rigid and is united by means of the clevis $H^2$, to end of pole through the medium of short chain $H^3$. Each jaw is stamped with a socket $h'$, $h^2$, which, when the jaws are closed form an opening through which the whiffle-tree hook of the snatch or assisting team fits. As the rod $G^2$, moves backward or forward, the clevis is thrown forward or backward and serves to close or open the jaws of the snatch block.

From the lever G, is run the cord, chain or cable $G^3$, which extends to the rear of the machine. The power of the assisting team exerts an outward strain upon the rod $G^2$, which transmits the pulling strain of the team to the trigger or slide rod. In order to utilize the forward pull of the assisting team so as to elevate the scraper body, after the same has been filled with dirt, it is only necessary that the driver pull upon the chain or cord $G^3$, which raises the lever G, to position shown in Fig. 3. As the lever is pulled backward the cam roll f, is turned or partially rotated through its connection therewith by the link rod G'. As the cam roll is turned over the forward pull of the snatch team causes the slide or trigger plate to ride over the rounding face of the cam roll. The forward movement of the slide plate causes the oscillating rod $D^2$, to be thrown forward, the movement of which raises the curved arms D and thus forces the body raising lever downward until a pawl carried thereby engages with the lock plate. It will thus be seen that the power of the snatch team is automatically transmitted to raise the filled scraper body. By utilizing the horse power for this purpose I am enabled to raise a much heavier load than can be raised by the efforts of the workmen. As the snatch block is pulled outward its full distance the tension of the chain $H^3$, throws the upper portion of the clevis $H^2$, backward, see Fig. 4, and thus permits the movable jaw H to lift. Consequently after the trigger or slide plate has moved its full outward distance the strain of the snatch team forces the jaws of the snatch block apart and thus automatically releases the team.

The dumping of the body causes a reversed movement to be given the parts just described, which places the same in position to be acted upon, in order to lower the body raising handle by the forward pull of the assisting team after the body has been refilled.

Having thus described my invention, what I claim as new, and desire to secure protection in by Letters Patent, is—

1. The combination with the body and the body-raising lever, of a slide connected with the lever so as to actuate the same when drawn forward by the snatch team, and means for automatically releasing the said slide when the body has been raised.

2. In a wheeled scraper, the combination with the body thereof, of the body raising lever, the serrated lock plate, the pawl carried by the lever, for automatically engaging with the serrated face of the lock plate when the lever is lowered, and mechanism connecting the lever with the body of the scraper in order to raise or lower the same with the downward or upward movement of the lever.

3. In a wheeled scraper, the combination with the scraper body, the lever for raising the same, the slide or trigger plate for lowering the lever with the outward movement thereof in order to elevate the body, the snatch block connected to the slide rod, the cam for holding the slide rod in locked position, and devices for operating the cam for releasing the slide rod so as to permit the power of the snatch team to be automatically transmitted in order to lower the body raising lever.

4. In a wheeled scraper, the combination with the body thereof, the lever for raising and lowering the same, the oscillating rod to which said lever is connected, the slide or trigger rod, levers forming connection between the oscillating rod and slide or trigger rod, cam roll over which the slide or trigger rod works, lever for releasing the slide rod from engagement with the cam roll, the snatch block and connection between the snatch block and slide rod whereby the same is moved outward, when released, by the power of the snatch team in order to lower the body raising lever.

5. In a wheeled scraper, the combination with devices for automatically transmitting the power of the snatch team so as to lower the body raising lever in order to elevate the body of the scraper, of a cam roll, the slide or trigger rod working thereover, and the spring for asserting a downward pressure upon the slide or trigger rod for the purpose of assuring the slide rod moving into locked engagement with the cam roll when moved its full distance backward.

6. In a wheeled scraper, the combination with mechanism for transmitting the power of the snatch team to the body raising lever, of a device for automatically releasing the snatch team after the body has been raised, said device consisting of two jaws pivoted together, a clevis secured to the lower jaw and through which the upper one works, and a chain connecting the clevis to the tongue of the scraper.

In testimony whereof I affix my signature in presence of two witnesses.

ALFRED F. BERNARD.

Witnesses:
N. A. ACKER,
DANIEL HANLON.